(12) United States Patent
 Nonaka et al.

(10) Patent No.: US 11,396,477 B2
(45) Date of Patent: Jul. 26, 2022

(54) PILLAR MOUNTING METHOD, METHOD FOR MANUFACTURING GLASS PANEL UNIT, AND PILLAR MOUNTING DEVICE

(71) Applicant: PANASONIC INTELLECTUAL PROPERTY MANAGEMENT CO., LTD., Osaka (JP)

(72) Inventors: Masataka Nonaka, Osaka (JP); Takeshi Shimizu, Toyama (JP); Haruhiko Ishikawa, Osaka (JP); Eiichi Uriu, Osaka (JP); Kazuya Hasegawa, Osaka (JP); Tasuku Ishibashi, Ishikawa (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 16/617,385

(22) PCT Filed: May 16, 2018

(86) PCT No.: PCT/JP2018/018850
§ 371 (c)(1),
(2) Date: Nov. 26, 2019

(87) PCT Pub. No.: WO2018/221213
PCT Pub. Date: Dec. 6, 2018

(65) Prior Publication Data
US 2020/0087200 A1 Mar. 19, 2020

(30) Foreign Application Priority Data
May 31, 2017 (JP) .............................. JP2017-108713

(51) Int. Cl.
*C03C 27/06* (2006.01)
*E06B 3/66* (2006.01)
*E06B 3/663* (2006.01)

(52) U.S. Cl.
CPC ............ *C03C 27/06* (2013.01); *E06B 3/6612* (2013.01); *E06B 3/66304* (2013.01)

(58) Field of Classification Search
CPC .... E06B 3/6612; E06B 3/66304; E06B 3/663; E06B 3/67326; E06B 3/67304; E06B 3/66; E06B 3/673; C03C 27/06; B32B 3/10
(Continued)

(56) References Cited

U.S. PATENT DOCUMENTS

| 4,997,354 A * | 3/1991 | Delbeck ............. E06B 3/66328 425/114 |
| 6,689,241 B1 * | 2/2004 | Delhorme ........... E06B 3/66304 156/109 |
| 2018/0051506 A1 | 2/2018 | Abe et al. | |

FOREIGN PATENT DOCUMENTS

| JP | S58-049786 U | 4/1983 |
| JP | H04-118928 U | 10/1992 |

(Continued)

OTHER PUBLICATIONS

International Search Report and Written Opinion issued in International Patent Application No. PCT/JP2018/018850, dated Jul. 10, 2018; with partial English translation.

(Continued)

*Primary Examiner* — Zachary M Davis
(74) *Attorney, Agent, or Firm* — McDermott Will & Emery LLP

(57) ABSTRACT

A pillar mounting method includes an accommodation step, a mounting step, and a displacement step. The accommodation step is a step of accommodating a plurality of pillars (Continued)

in storage with the plurality of pillars being stacked on each other. The mounting step is a step of pushing one pillar of the plurality of pillars accommodated in the storage out of the storage and mounting the one pillar on a substrate including a glass pane. The displacement step is a step of changing a relative location between the substrate and the storage. The mounting step and the displacement step are alternately repeated to mount the plurality of pillars in a predetermined arrangement on the substrate such that the plurality of pillars are apart from each other.

4 Claims, 6 Drawing Sheets

(58) Field of Classification Search
USPC .............................................................. 65/34
See application file for complete search history.

(56) References Cited

FOREIGN PATENT DOCUMENTS

| JP | 2004-352566 A | 12/2004 |
| JP | 2005-231930 A | 9/2005 |
| JP | 2016-017020 A | 2/2016 |
| JP | 2016-108799 A | 6/2016 |
| WO | 2014/136152 A1 | 9/2014 |
| WO | 2016/152052 A1 | 9/2016 |

OTHER PUBLICATIONS

Japanese Office Action issued in corresponding Japanese Patent Application No. 2019-522099, dated Dec. 1, 2020, with English translation.

* cited by examiner

PILLAR MOUNTING METHOD, METHOD FOR MANUFACTURING GLASS PANEL UNIT, AND PILLAR MOUNTING DEVICE

CROSS-REFERENCE OF RELATED APPLICATIONS

This application is the U.S. National Phase under 35 U.S.C. § 371 of International Patent Application No. PCT/JP2018/018850, filed on May 16, 2018, which in turn claims the benefit of Japanese Application No. 2017-108713, filed on May 31, 2017, the entire disclosures of which Applications are incorporated by reference herein.

TECHNICAL FIELD

The present disclosure relates to pillar mounting methods, methods for manufacturing glass panel units, and pillar mounting devices, and specifically, to a pillar mounting method, a method for manufacturing a glass panel unit, and a pillar mounting device which are configured to mount a plurality of pillars in a predetermined arrangement on a substrate including at least a glass pane.

BACKGROUND ART

A glass panel unit including a pair of substrates between which an evacuated space is formed is conventionally known. In order to manufacture such a glass panel unit, it is common to mount a plurality of pillars (spacers) on one substrate, arrange another substrate such that the plurality of pillars are sandwiched between the one substrate and the another substrate, and hermetically bond both the substrates with a seal material located to surround the plurality of pillars (see, for example, Patent Literature 1).

In order to mount the plurality of pillars on the substrate, the pillars are sucked one by one by using a suction pad or the like, are transported above the substrate, and are then released at respective predetermined locations on the substrate. However, when the number of pillars to be placed on the substrate is large, such a method takes a long time to complete the mounting.

CITATION LIST

Patent Literature

Patent Literature 1: JP 2005-231930 A

SUMMARY OF INVENTION

It is an object of the present disclosure to provide a pillar mounting method, a method for manufacturing a glass panel unit, and a pillar mounting device which enable a plurality of pillars to be efficiently mounted on a substrate.

The pillar mounting method according to one aspect of the present disclosure includes an accommodation step, a mounting step, and a displacement step. The accommodation step is a step of accommodating a plurality of pillars in storage with the plurality of pillars being stacked on each other. The mounting step is a step of pushing, out of the storage, one pillar of the plurality of pillars accommodated in the storage and mounting the one pillar on a substrate including a glass pane. The displacement step is a step of changing a relative location between the substrate and the storage. In the pillar mounting method according to this aspect, the mounting step and the displacement step are alternately repeated to mount the plurality of pillars in a predetermined arrangement on the substrate such that the plurality of pillars are apart from each other.

The method for manufacturing a glass panel unit according to one aspect of the present disclosure includes a first process, a second process, and a third process. The first process is a process of mounting a plurality of pillars on a first substrate including a first glass pane. The second process is a process of placing a second substrate including a second glass pane to face the first substrate with a seal material having a frame shape being provided between the second substrate and the first substrate, and hermetically bonding the first substrate and the second substrate to each other with the seal material. The third process is a process of evacuating and sealing an internal space surrounded by the first substrate, the second substrate, and the seal material. The first process includes an accommodation step, a mounting step, and a displacement step. The accommodation step is a step of accommodating the plurality of pillars in storage with the plurality of pillars being stacked on each other. The mounting step is a step of pushing, out of the storage, one pillar of the plurality of pillars accommodated in the storage and mounting the one pillar on the first substrate. The displacement step is a step of changing a relative location between the first substrate and the storage. In the first process, the mounting step and the displacement step are alternately repeated to mount the plurality of pillars in a predetermined arrangement on the first substrate such that the plurality of pillars are apart from each other.

The pillar mounting device according to one aspect of the present disclosure includes storage, a pusher, and a displacement mechanism. The storage accommodates a plurality of pillars stacked on each other. The pusher is configured to push, out of the storage, one pillar of the plurality of pillars accommodated in the storage and mounting the one pillar on a substrate including a glass pane. The displacement mechanism is configured to change a relative location between the substrate and the storage.

DESCRIPTION OF EMBODIMENTS

FIGS. 1 to 4 schematically show a pillar mounting device of one embodiment. The pillar mounting device is a device configured to mount a plurality (a large number of) of pillars 4 in a predetermined arrangement on one surface (in detail, an upper surface 11) in a thickness direction of a substrate 1. As used in this disclosure, "mounting" includes arranging the plurality of pillars 4 without being fixed to the substrate 1. Moreover, "mounting" mentioned herein of course includes arranging the plurality of pillars 4 with the pillars 4 being fixed to the substrate 1.

The substrate 1 and the plurality of pillars 4 mounted thereon are members which form a part of a glass panel unit.

Figure 5:
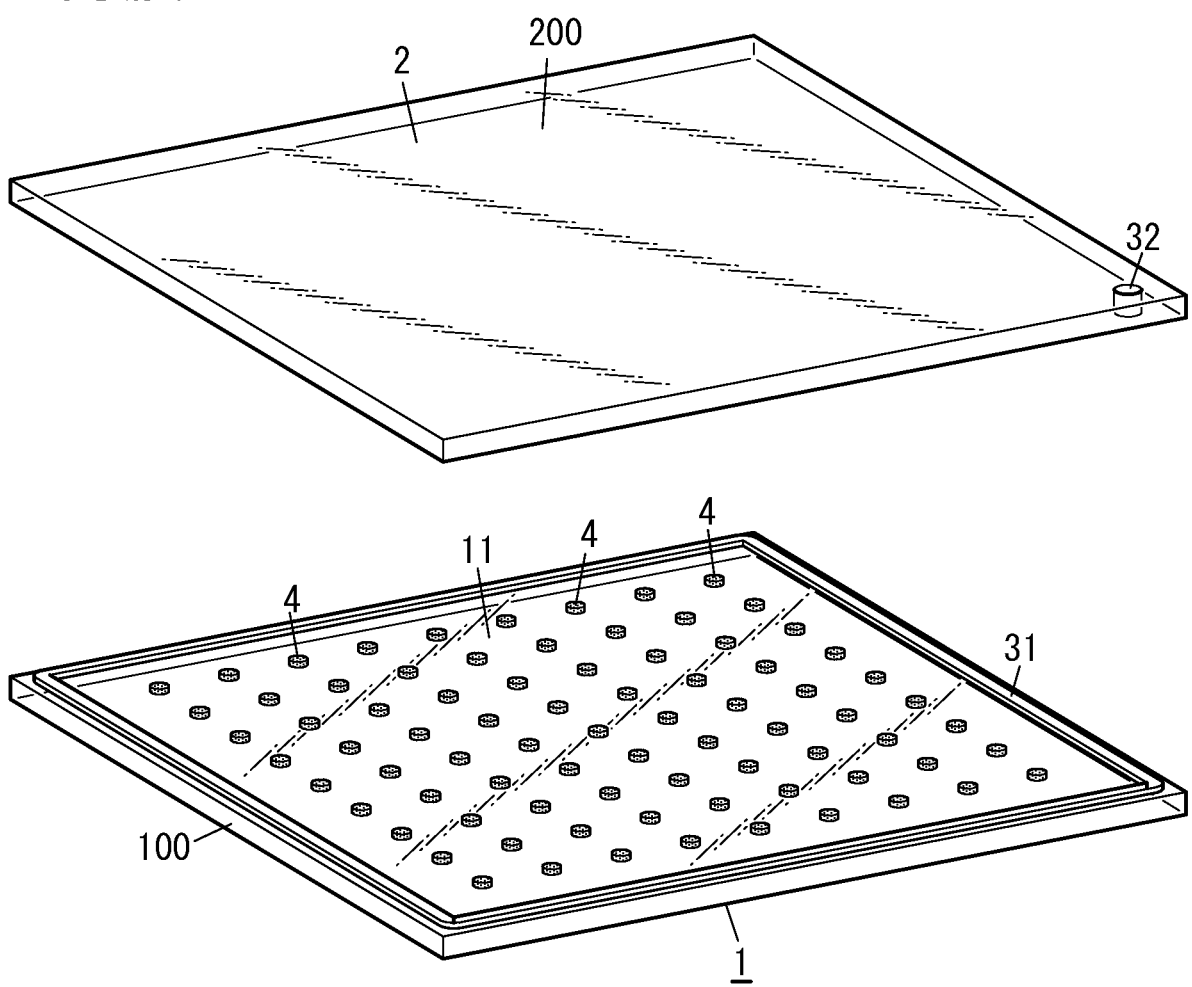
FIG. 5 is a perspective view illustrating how another substrate is superimposed on the substrate.

Another substrate 2 (see FIGS. 5 and 6) is superposed on the substrate 1 provided with the plurality of pillars 4 such that the another substrate 2 faces the upper surface 11 of the substrate 1, and the substrates 1 and 2 facing each other are hermetically bonded to each other with a seal material 31 having a frame shape. The plurality of pillars 4 are located to be surrounded by the seal material 31.

Figure 6:
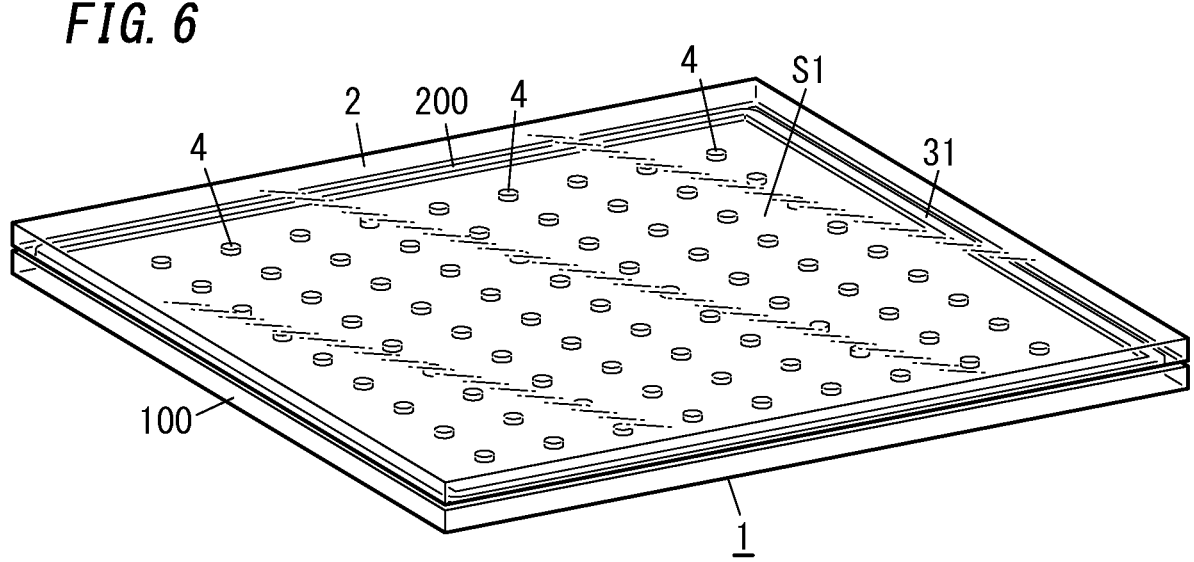
FIG. 6 is a perspective view illustrating a glass panel unit including the substrate and the another substrate.

An internal space S1 is formed between the substrate 1 and 2 bonded to each other with the seal material 31 (see FIG. 6). In the internal space S1, the plurality of pillars 4 are located. The plurality of pillars 4 maintain a distance between the substrates 1 and 2. In the one embodiment, the internal space S1 is evacuated to a predetermined degree of vacuum through a ventilation hole 32 (see FIG. 5) formed in the substrate 2, and then, the ventilation hole 32 is sealed. This provides a glass panel unit shown in FIG. 6.

The substrate 1 includes a glass pane 100, and the substrate 2 includes a glass pane 200. The glass pane 100 may have a surface coated with an appropriate film such as a low-emissivity film, and the glass pane 200 may have a surface coated with an appropriate film such as a low-emissivity film.

The glass panel unit described above is produced, for example, by a method for manufacturing a glass panel unit described below. The substrate 1 is hereinafter referred to as a first substrate 1, and the substrate 2 is referred to as a second substrate 2, as required. Moreover, the glass pane 100 included in the first substrate 1 is referred to as a first glass pane 100, and the glass pane 200 included in the second substrate 2 is referred to as a second glass pane 200.

Figure 1:
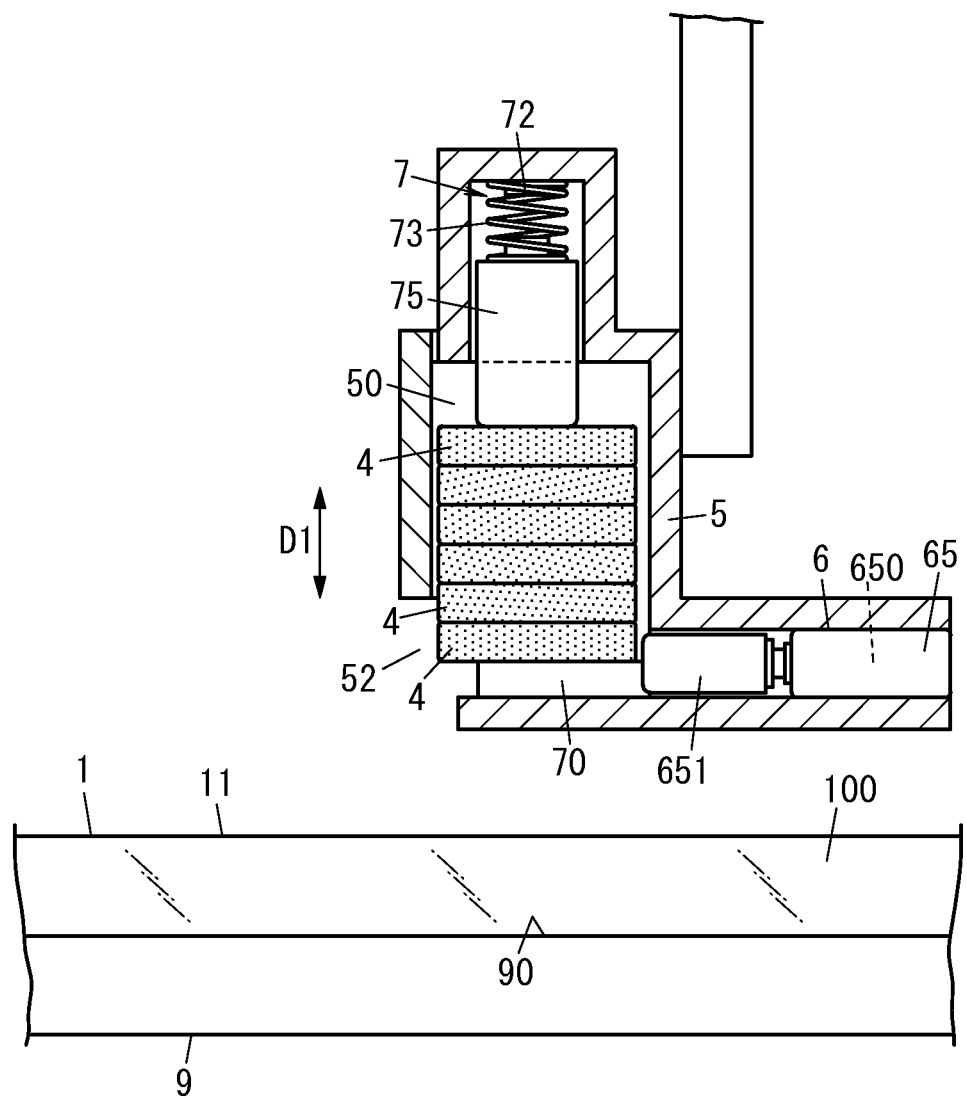
FIG. 1 is a partially cutaway side view illustrating a main part of a pillar mounting device of one embodiment.
Figure 2:
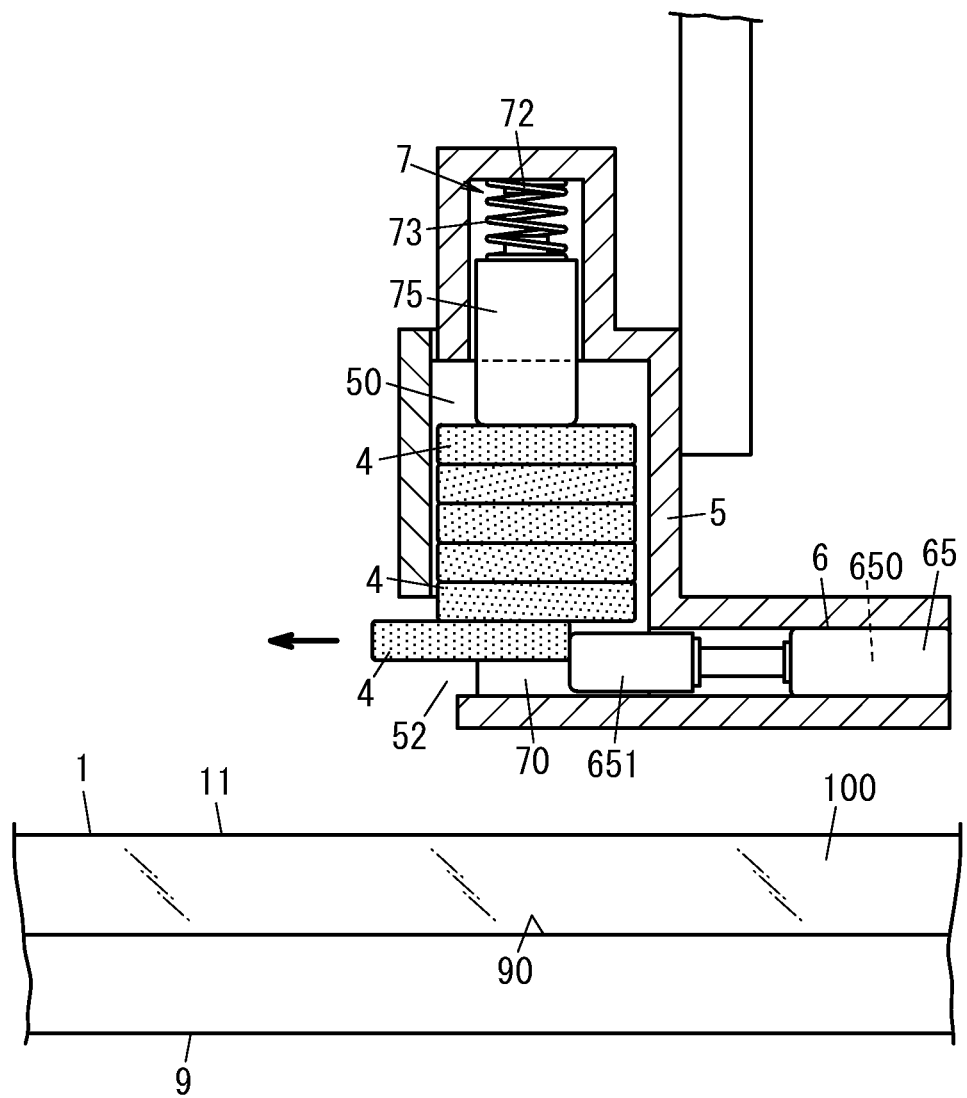
FIG. 2 is a partially cutaway side view illustrating how one pillar is pushed out of the pillar mounting device.
Figure 3:
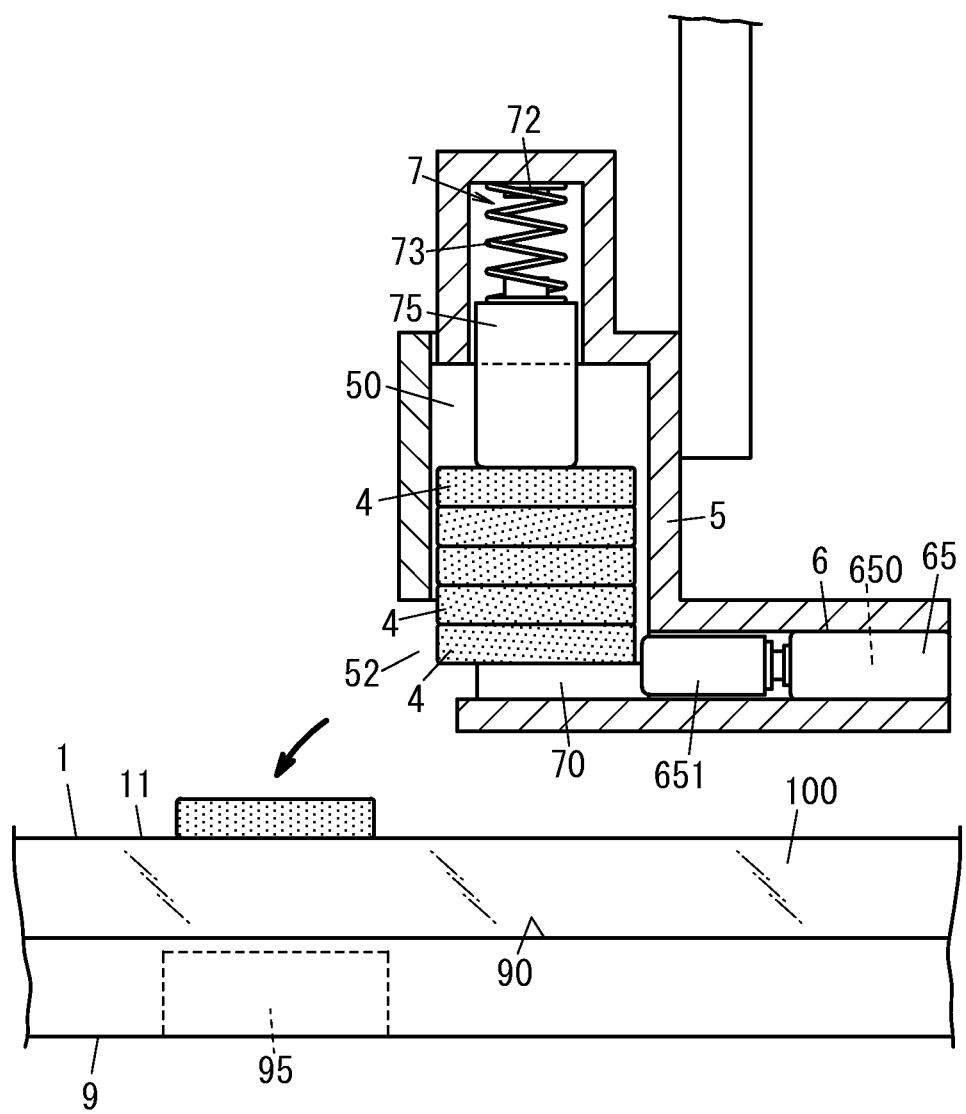
FIG. 3 is a partially cutaway side view illustrating a state where one pillar is pushed out of the pillar mounting device.

The method for manufacturing the glass panel unit of one embodiment includes a first process, a second process, and a third process. As illustrated in FIG. 3, the first process is a process of mounting the plurality of pillars 4 on one surface (the upper surface 11) in the thickness direction of the first substrate 1 including the first glass pane 100. As illustrated in FIG. 6, the second process is a process of: placing the second substrate 2 including the second glass pane 200 to face the one surface (the upper surface 11) of the first substrate 1 with the seal material 31 having a frame shape provided between the second substrate 2 and the one surface (the upper surface 11); and hermetically bonding the first substrate 1 and the second substrate 2 to each other with the seal material 31.

As shown in FIGS. 1 to 4, the pillar mounting device of the one embodiment includes storage 5 and a pusher 6. The storage 5 allows a plurality of pillars 4 to be accommodated therein. The pusher 6 is configured to push the pillars 4 one by one out of the storage 5.

The storage 5 has an accommodation space 50. The plurality of pillars 4 are accommodated in the accommodation space 50. Each of the plurality of pillars 4 has a columnar shape (cylindrical shape). The plurality of pillars 4 are accommodated in the accommodation space 50 in a state where the pillars 4 are vertically stacked on each other (in such a state where an axial direction D1 of each of the plurality of pillars 4 is parallel to the upward and downward directions).

The storage 5 has a window 52 for opening a lower portion of the accommodation space 50 to the outside. The window 52 has a shape which allows one pillar 4 to pass therethrough in the horizontal direction.

The pusher 6 of the one embodiment is installed in the storage 5. The pusher 6 is configured to push out only a lowermost pillar 4 of the plurality of pillars 4 stacked on each other in the accommodation space 50 in one direction (horizontal direction) toward the window 52.

The pusher 6 is mainly composed of, for example, a solenoid actuator 65. The solenoid actuator 65 includes a solenoid (coil) 650 and a movable portion 651. The movable portion 651 is located laterally to the lowermost pillar 4 of the plurality of pillars 4 arranged in the accommodation space 50. Controlling a current flowing through the solenoids 650 enables the movable portion 651 to be reciprocated in the horizontal direction. In the pusher 6, the movable portion 651 laterally pushes the lowermost pillar 4 of the plurality of pillars 4 arranged in the accommodation space 50 so as to push the lowermost pillar 4 out of the storage 5 through the window 52 of the storage 5.

The pillar mounting device of the one embodiment further includes a holding mechanism 7. The holding mechanism 7 is installed in the storage 5. The holding mechanism 7 pinches and holds the plurality of pillars 4 stacked in the accommodation space 50. The holding mechanism 7 includes, for example, a support 70 and a biasing mechanism (pressing mechanism) 72. The support 70 supports the plurality of pillars 4 stacked in the accommodation space 50. The biasing mechanism 72 pushes the plurality of pillars 4 stacked in the accommodation space 50 from an opposite side from the support 70 toward the support 70.

The support 70 of the one embodiment is in contact with a lower surface of the lowermost pillar 4 of the plurality of pillars 4 stacked in the accommodation space 50 and supports the plurality of pillars 4 from below.

The biasing mechanism 72 is configured to resiliently push downward, for example, an uppermost pillar 4 of the plurality of pillars 4 stacked in the accommodation space 50. The biasing mechanism 72 of the one embodiment is in contact with an upper surface of the uppermost pillar 4 of the plurality of pillars 4 stacked in the accommodation space 50 and downwardly pushes the plurality of pillars 4 from above. As a result, the holding mechanism 7 pinches the plurality of pillars 4 accommodated in the storage 5 from above and below to hold the plurality of pillars 4.

The biasing mechanism 72 is mainly composed of, for example, a spring member 73 and a pressing member 75 to which the spring member 73 applies downward biasing force. The pressing member 75 is disposed above the plurality of pillars 4 stacked in the accommodation space 50. The spring member 73 is disposed on the pressing member 75. The spring member 73 downwardly pushes the pressing member 75. The pressing member 75 pushed by the spring member 73 is pressed against the uppermost pillar 4 from above. This applies to the plurality of pillars 4 vertically stacked on each other, resilient holding force for downwardly pressing the whole of the pillars 4. That is, the resilient force of the spring member 73 acts on the whole of the plurality of pillars 4 as downward force pressing the plurality of pillars 4 stacked in the accommodation space 50 toward the support 70, and thereby, the plurality of pillars 4 are pinched and held between the pressing member 75 and the support 70. Note that the support 70 may be located above the plurality of pillars 4. In this case, the biasing mechanism 72 upwardly presses the plurality of pillars 4 from below.

Figure 4:
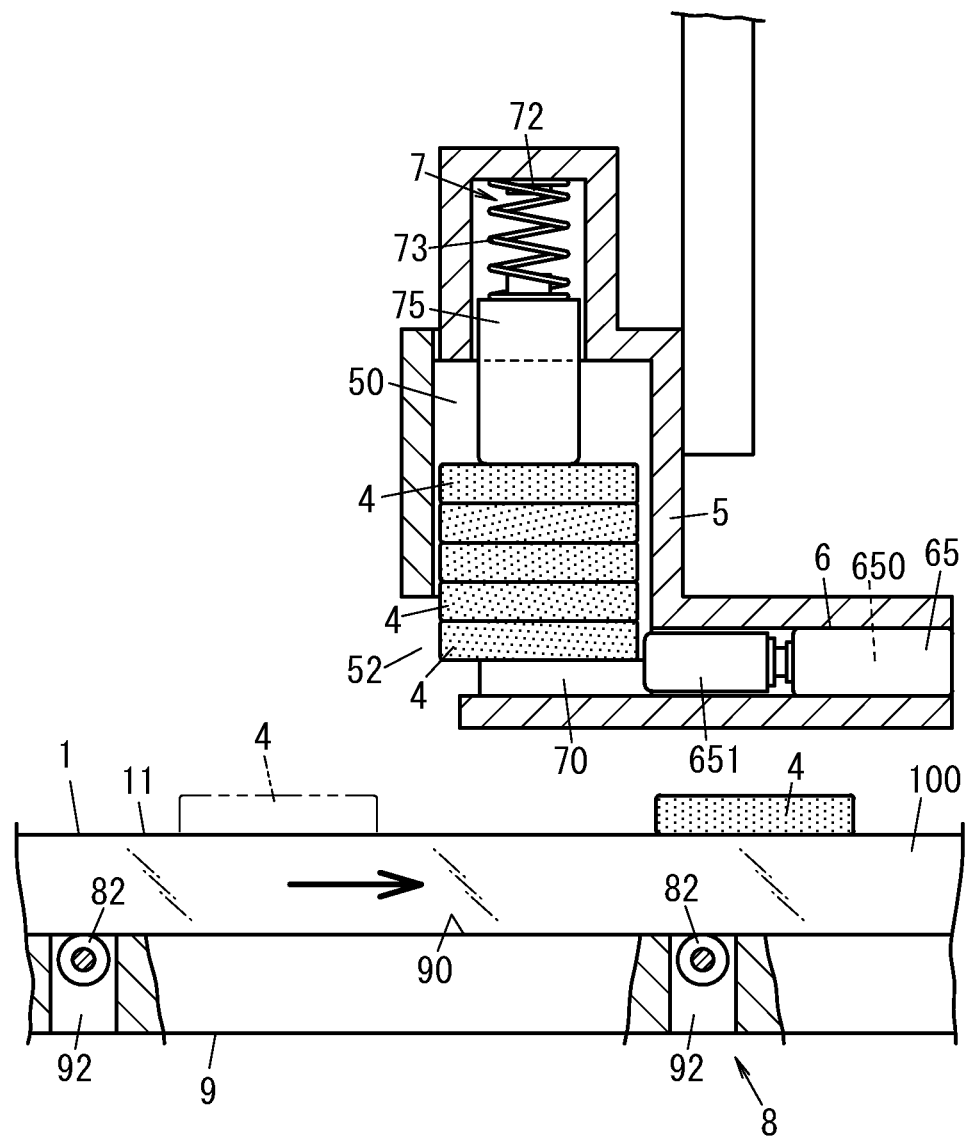
FIG. 4 is a partially cutaway side view illustrating how a substrate in the pillar mounting device is displaced by one pitch.

The pillar mounting device of the one embodiment further includes a displacement mechanism 8 (see FIG. 4). The displacement mechanism 8 is configured to change the relative location between the substrate 1 and the storage 5.

The pillar mounting device of the one embodiment includes a stage 9 which supports the substrate 1. The stage 9 has a support surface 90. The support surface 90 is an upper surface of the stage 9. The support surface 90 is horizontal and flat. The support surface 90 supports the substrate 1 from below so that the substrate 1 maintains a horizontal position. When the substrate 1 is supported by the stage 9, the upper surface 11 is in an upward position facing away from the gravity direction. The storage 5 is installed so as to be located above the substrate 1 supported by the support surface 90.

As shown in the FIG. 4, the displacement mechanism 8 of the one embodiment includes a plurality of rollers 82 for substrate transportation. The plurality of rollers 82 are installed in the stage 9. The stage 9 of the one embodiment has a plurality of through holes 92 formed to correspond to the plurality of rollers 82 on a one-to-one basis. Each of the plurality of rollers 82 is disposed in a corresponding one of the through holes 92 so as to be vertically movable.

The rollers 82 are freely projectable from and retractable into the support surface 90 of the stage 9 through the through holes 92 formed in the stage 9. That is, the rollers 82 are movable between a location where the rollers 82 upwardly protrudes beyond the supporting surface 90 of the stage 9 and a location where the rollers 82 are sunk in the respective through holes 92 so as to be disposed below the supporting surface 90.

The displacement mechanism 8 includes, for example, a first drive mechanism configured to drive the plurality of rollers 82 vertically with respect to the stage 9 and a second drive mechanism configured to rotationally drive the rollers 82. Each of the first drive mechanism and the second drive mechanism includes, for example, a motor. To transport the substrate 1, an upper portion of each roller 82 protrudes from the corresponding through hole 92 beyond the support surface 90, and each roller 82 is rotationally driven. For example, when the pillars 4 are mounted on the substrate 1, the substrate 1 is stably supported on the support surface 90 of the stage 9 with the rollers 82 sunk in the respective through holes 92.

In the pillar mounting device of the one embodiment, the displacement mechanism 8 includes a mechanism (the plurality of rollers 82, the first drive mechanism, and the second drive mechanism) for moving the substrate 1 in the horizontal direction with respect to the stage 9. That is, the displacement mechanism 8 includes a mechanism configured to move the substrate 1 in the horizontal direction. However, the displacement mechanism 8 may include a mechanism configured to move the storage 5 in the horizontal direction with respect to the stage 9 (and the substrate 1 supported by the stage 9). Alternatively, the displacement mechanism 8 may include a mechanism configured to move both the substrate 1 and the storage 5 with respect to the stage 9.

In FIGS. 1 to 4, one storage 5, and one pusher 6 and one holding mechanism 7 attached to the one storage 5 are shown. However, the pillar mounting device may include only one set of, or a plurality of sets of, the storage 5, the pusher 6, and the holding mechanism 7. In the latter case, the pillars 4 are supplied to the substrate 1 from the storages 5 arranged above the substrate 1.

In order to mount, by using the pillar mounting device of the one embodiment described above, the plurality of (a large number of) pillars 4 on the upper surface 11 of the substrate 1 such that the plurality of pillars 4 are apart from each other, the plurality of pillars 4 are, first of all, vertically stacked on each other and are accommodated in the accommodation space 50 of the storage 5 (accommodation step).

Then, a step of pushing the pillars 4 out of the storage 5 located above the substrate 1 to mount the pillars 4 on the upper surface 11 of the substrate 1 (mounting step) and a step of changing the relative location between the substrate 1 and the storage 5 in the horizontal direction (displacement step) are alternately performed.

The first process of the method for manufacturing the glass panel unit specifically described above has an accommodation step and a repetition step. The accommodation step is a step of accommodating the plurality of pillars 4 in the storage 5 with the plurality of pillars 4 being stacked on each other. The repetition step is performed after the accommodation step. The repetition step includes a mounting step and a displacement step. The repetition step is a step of alternately repeating the mounting step and the displacement step.

The mounting step is a step of: pushing, out of the storage 5 located above the substrate 1, one pillar 4 of the plurality of pillars 4 accommodated in the storage 5; and mounting the one pillar 4 on the upper surface 11 of the substrate 1. The displacement step is a step of changing the relative location of the substrate 1 and the storage 5 (location of the substrate 1 with respect to the storage 5) in the horizontal direction.

That is, in the pillar mounting method performed by using the pillar mounting device of the one embodiment, the mounting step of pushing the lowermost pillar 4 of the plurality of pillars 4 accommodated in the storage 5 to the outside through the window 52 by the pusher 6 and the displacement step are alternately repeated.

The number of the pillars 4 accommodated in the storage 5 decreases one by one each time the pillar 4 is pushed out of the storage 5. Here, downward biasing force (downward force) is applied to each pillar 4 in the accommodation space 50 by the biasing mechanism 72. Therefore, when the next mounting step (second and subsequent mounting steps) is reached, a pillar 4 is stably set in the location adjacent to the pusher 6 in the horizontal direction (location where the movable portion 651 can push the pillar 4).

It is also preferable that the stage 9 is formed of a magnet stage, and each pillar 4 contains a magnetic body (such as metal) in order to suppress the occurrence of positional displacement of the pillar 4 pushed out of the storage 5 on the upper surface 11 of the substrate 1. According to this embodiment, magnetic attraction force acting between the stage 9 and each pillar 4 suppresses the positional displacement of each pillar 4 from the substrate 1, each pillar 4 being disposed on the upper surface 11 of the substrate 1.

When the stage 9 is formed of a magnet stage, the stage 9 has at least a portion 95 provided with a magnet (see FIG. 3). This portion 95 is a portion to be located below a pillar 4 when the pillar 4 is pushed out of the storage 5 and then mounted on the upper surface 11 of the substrate 1. Note that the stage 9 formed of the magnet stage may be a magnet only in the portion 95 or the entirety of the stage 9 may be a magnet.

The magnet provided to the stage 9 is preferably an electromagnet. In this case, the electromagnet can be energized to exert magnetic force in the mounting step, and the electromagnet can be de-energized to lose magnetic force in the displacement step of displacing the substrate 1 by one pitch in one direction. Thus, processes of mounting the plurality of pillars 4 on the substrate 1 are performed more accurately and efficiently.

As described above on the basis of the attached drawings, a pillar mounting method of a first aspect includes an accommodation step, a mounting step, and a displacement step. The accommodation step is a step of accommodating a plurality of pillars (4) in storage (5) with the plurality of pillars (4) being stacked on each other. The mounting step is a step of pushing one pillar (4) of the plurality of pillars (4) accommodated in the storage (5) out of the storage (5) and mounting the one pillar (4) on a substrate (1) including a glass pane (100). The displacement step is a step of changing a relative location between the substrate (1) and the storage (5). In the pillar mounting method according to the first aspect, the mounting step and the displacement step are alternately repeated to mount the plurality of pillars (4) in a predetermined arrangement on the substrate (1) such that the plurality of pillars (4) are apart from each other.

According to the first aspect, even when a large number of pillars (4) has to be mounted on the substrate (1), pushing out the plurality of pillars (4) accommodated in the storage (5) one by one enables the entire process to be efficiently completed.

A pillar mounting method of a second aspect can be realized in combination with the first aspect. In the accommodation step of the second aspect, the plurality of pillars (4) are accommodated in the storage (5) with the plurality of pillars (4) being pinched by a holding mechanism (7). In the mounting step, the one pillar (4) of the plurality of pillars (4) pinched by the holding mechanism (7) is pushed out of the storage (5).

In the second aspect, the plurality of pillars (4) are accommodated in the storage (5) with the pillars (4) being pinched by the holding mechanism (7). Therefore, even if the number of the pillars (4) in the storage (5) changes, the pillars (4) can be stably mounted in the storage (5). This enables the pillars (4) to be appropriately pushed out of the storage (5).

Also, as described with reference to the attached drawings, a method for manufacturing the glass panel unit of a third aspect includes a first process, a second process, and a third process. The first process is a process of mounting a plurality of pillars (4) on a first substrate (1) including a first glass pane (100). The second process is a process of placing a second substrate (2) including a second glass pane (200) to face the first substrate (1) with a seal material (31) having a frame shape being provided between the second substrate (2) and the first substrate (1), and hermetically bonding the first substrate (1) and the second substrate (2) to each other with the seal material (31). Third process is a process of evacuating and sealing an internal space (S1) surrounded by the first substrate (1), the second substrate (2), and the seal material (31). The first process includes an accommodation step, a mounting step, and a displacement step. The accommodation step is a step of accommodating the plurality of pillars (4) in the storage (5) with the plurality of pillars (4) being stacked on each other. The mounting step is a step of pushing one pillar (4) of the plurality of pillars (4) accommodated in the storage (5) out of the storage (5) and mounting the one pillar (4) on the first substrate (1). The displacement step is a step of changing a relative location between the first substrate (1) and the storage (5). In the first process, the mounting step and the displacement step are alternately repeated to mount the plurality of pillars (4) in a predetermined arrangement on the first substrate (1) such that the plurality of pillars (4) are apart from each other.

According to the third aspect, the internal space (S1) which is evacuated is formed between the first substrate (1) and the second substrate (2), and a glass panel unit excellent in thermal insulation properties can be manufactured. Further, pushing out the plurality of pillars (4) accommodated in the storage (5) one by one enables the plurality of pillars (4) to be highly efficiently mounted on the substrate (1).

Also, as described with reference to the attached drawings, a pillar mounting device of a fourth aspect includes storage (5), a pusher (6), and a displacement mechanism (8). The storage (5) accommodates a plurality of pillars (4) stacked on each other. The pusher (6) is configured to push one pillar (4) of the plurality of pillars (4) accommodated in the storage (5) out of the storage (5) and mount the one pillar (4) on a substrate (1) including a glass pane (100). The displacement mechanism (8) is configured to change a relative location between the substrate (1) and the storage (5).

According to the fourth aspect, even when a large number of pillars (4) has to be mounted on the substrate (1), pushing out the plurality of pillars (4) accommodated in the storage (5) one by one enables the entire process to be efficiently completed.

A pillar mounting device of a fifth aspect can be realized in combining with the fourth aspect. The pillar mounting device of the fifth aspect further includes a holding mechanism (7). The holding mechanism (7) pinches a plurality of pillars (4) accommodated in storage (5). The pusher (6) is configured to push out one of the plurality of pillars (4) pinched by the holding mechanism (7) from the storage (5).

According to a fifth aspect, the plurality of pillars (4) are accommodated in the storage (5) with the pillars (4) being pinched by the holding mechanism (7). Therefore, even if the number of the pillars (4) in the storage (5) changes, the pillar (4) is stably set in a location adjacent to the pusher (6) (location to where the pillar (4) is to be pushed by the pusher (6)). This enables the pillars (4) to be appropriately pushed out of the storage (5).

A pillar mounting device of a sixth aspect can be realized in combining with the fifth aspect. The holding mechanism (7) of the sixth embodiment has a biasing mechanism (72). The biasing mechanism (72) is configured to bias the plurality of pillars (4) accommodated in the storage (5) toward a location adjacent to the pusher (6).

According to the sixth aspect, the biasing mechanism (72) pushes the plurality of pillars (4) toward the location adjacent to the pusher (6), and thereby, the plurality of pillars (4) accommodated in the storage (5) can be held.

A pillar mounting device of a seventh aspect can be realized in combining with the sixth aspect. The biasing mechanism (72) of the seventh aspect has a spring member (73) and a pressing member (75). The pressing member (75) is configured to be pushed by the spring member (73) and press the plurality of pillars (4).

According to the seventh aspect, the resilient force of the spring member (73) can be used to push the plurality of pillars (4) accommodated in the storage (5).

Note that the pillar mounting method, the method for manufacturing the glass panel unit, and the pillar mounting device are not limited to the above-described embodiments, and appropriate design modification may be made.

REFERENCE SIGNS LIST

S1 INTERNAL SPACE
1 SUBSTRATE (FIRST SUBSTRATE)
100 GLASS PANE (FIRST GLASS PANE)
2 SUBSTRATE (SECOND SUBSTRATE)
200 GLASS PANE (SECOND GLASS PANE)
31 SEAL MATERIAL
4 PILLAR
5 STORAGE
6 PUSHER
7 HOLDING MECHANISM

72 BIASING MECHANISM
73 SPRING MEMBER
75 PRESSING MEMBER
8 DISPLACEMENT MECHANISM

The invention claimed is:

1. A pillar mounting method, comprising:
an accommodation step of accommodating a plurality of pillars in storage with the plurality of pillars being vertically stacked on each other;
a mounting step of pushing, out of the storage, one pillar of the plurality of pillars accommodated in the storage in a state where the plurality of pillars are vertically stacked on each other and mounting the one pillar on a substrate including a glass pane; and
a displacement step of changing a relative location between the substrate and the storage,
the mounting step and the displacement step being alternately repeated to mount the plurality of pillars in a predetermined arrangement on the substrate such that the plurality of pillars are apart from each other,
in the accommodation step, the plurality of pillars being accommodated in the storage with the plurality of pillars being pinched by a holding mechanism, and
in the mounting step, the one pillar of the plurality of pillars pinched by the holding mechanism being pushed out of the storage.

2. The pillar mounting method of claim 1, wherein each of the plurality of pillars are aligned along a single axis.

3. A method for manufacturing a glass panel unit, comprising:
a first process of mounting a plurality of pillars on a first substrate including a first glass pane;
a second process of:
placing a second substrate including a second glass pane to face the first substrate with a seal material having a frame shape being provided between the second substrate and the first substrate and
hermetically bonding the first substrate and the second substrate to each other with the seal material; and
a third process of evacuating and sealing an internal space surrounded by the first substrate, the second substrate, and the seal material,
the first process including:
an accommodation step of accommodating the plurality of pillars in the storage with the plurality of pillars being vertically stacked on each other;
a mounting step of pushing, out of the storage, one pillar of the plurality of pillars accommodated in the storage in a state where the plurality of pillars are vertically stacked on each other and mounting the one pillar on the first substrate; and
a displacement step of changing a relative location between the first substrate and the storage,
in the first process, the mounting step and the displacement step being alternately repeated to mount the plurality of pillars in a predetermined arrangement on the first substrate such that the plurality of pillars are apart from each other,
in the accommodation step, the plurality of pillars being accommodated in the storage with the plurality of pillars being pinched by a holding mechanism, and
in the mounting step, the one pillar of the plurality of pillars pinched by the holding mechanism being pushed out of the storage.

4. The method for manufacturing a glass panel unit of claim 3, wherein each of the plurality of pillars are aligned along a single axis.

* * * * *